United States Patent
Cader et al.

(10) Patent No.: US 8,412,185 B2
(45) Date of Patent: Apr. 2, 2013

(54) METHOD AND APPARATUS FOR SWITCHING DEVICES USING NEAR FIELD COMMUNICATION

(75) Inventors: Muhammad Abdul Cader, Bangalore (IN); Mukesh Tanwani, Bangalore (IN)

(73) Assignee: Nokia Corporation, Espoo (FI)

( * ) Notice: Subject to any disclaimer, the term of this patent is extended or adjusted under 35 U.S.C. 154(b) by 108 days.

(21) Appl. No.: 12/882,172

(22) Filed: Sep. 14, 2010

(65) Prior Publication Data

US 2011/0065384 A1    Mar. 17, 2011

(30) Foreign Application Priority Data

Sep. 14, 2009  (IN) ............................ 2208/CHE/2009

(51) Int. Cl.
*H04W 4/00*    (2009.01)
(52) U.S. Cl. ................. 455/426.1; 455/552.1; 455/41.2; 370/353
(58) Field of Classification Search ............... 455/426.1, 455/552.1, 41.2, 428, 569.2; 348/14.11; 370/353
See application file for complete search history.

(56) References Cited

U.S. PATENT DOCUMENTS

| | | | |
|---|---|---|---|
| 7,145,454 B2 | 12/2006 | Linjama et al. | |
| 7,440,753 B2* | 10/2008 | Chen et al. | 455/426.1 |
| 7,775,432 B2 | 8/2010 | Jalkanen et al. | |
| 7,876,744 B2* | 1/2011 | Kwon | 370/353 |
| 8,010,152 B2* | 8/2011 | Kim | 455/552.1 |
| 2003/0224840 A1* | 12/2003 | Frank et al. | 455/575.9 |
| 2004/0002305 A1 | 1/2004 | Byman-Kivivuori et al. | |
| 2005/0169218 A1* | 8/2005 | Ho | 370/338 |
| 2005/0181785 A1* | 8/2005 | Chen et al. | 455/428 |
| 2007/0026904 A1* | 2/2007 | Matsuda | 455/569.2 |
| 2007/0047516 A1* | 3/2007 | Kottilingal | 370/352 |
| 2008/0288578 A1 | 11/2008 | Silfverberg | |
| 2010/0069003 A1* | 3/2010 | Kim | 455/41.2 |
| 2011/0081862 A1* | 4/2011 | Matsuda | 455/41.3 |
| 2011/0181681 A1* | 7/2011 | Lee | 348/14.02 |

* cited by examiner

*Primary Examiner* — Minh D Dao
(74) *Attorney, Agent, or Firm* — Ditthavong Mori & Steiner, P.C.

(57) ABSTRACT

An approach is provided for switching devices using near field communication by transferring services. A first device executes an online service. The first device initiates communication to a second device over a near field communication link during the execution of the online service to coordinate the transfer of information relating to the online service. The first device initiates the transfer of information relating to the online service to the second device for execution of the online service by the second device based on the communication.

21 Claims, 8 Drawing Sheets

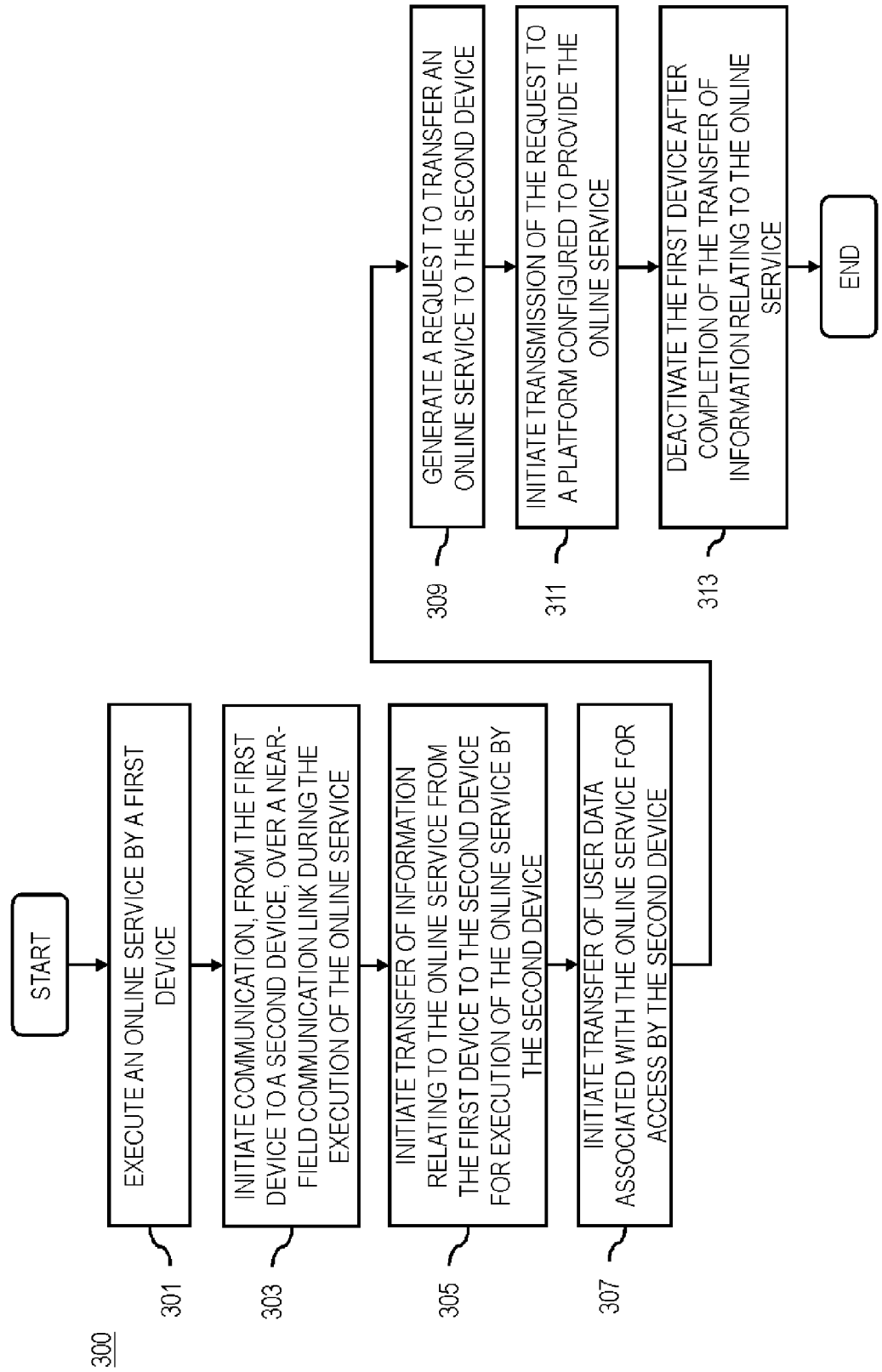

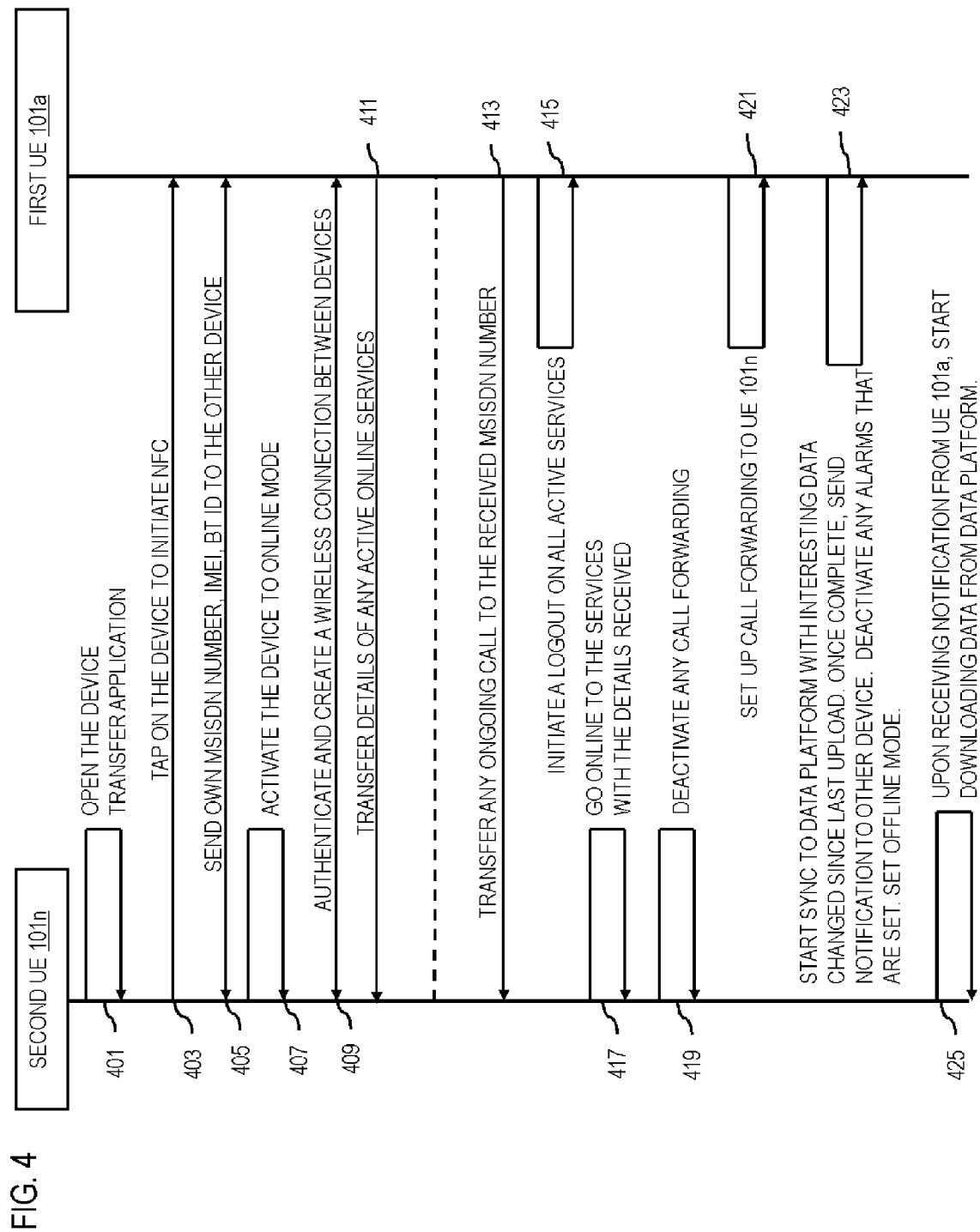

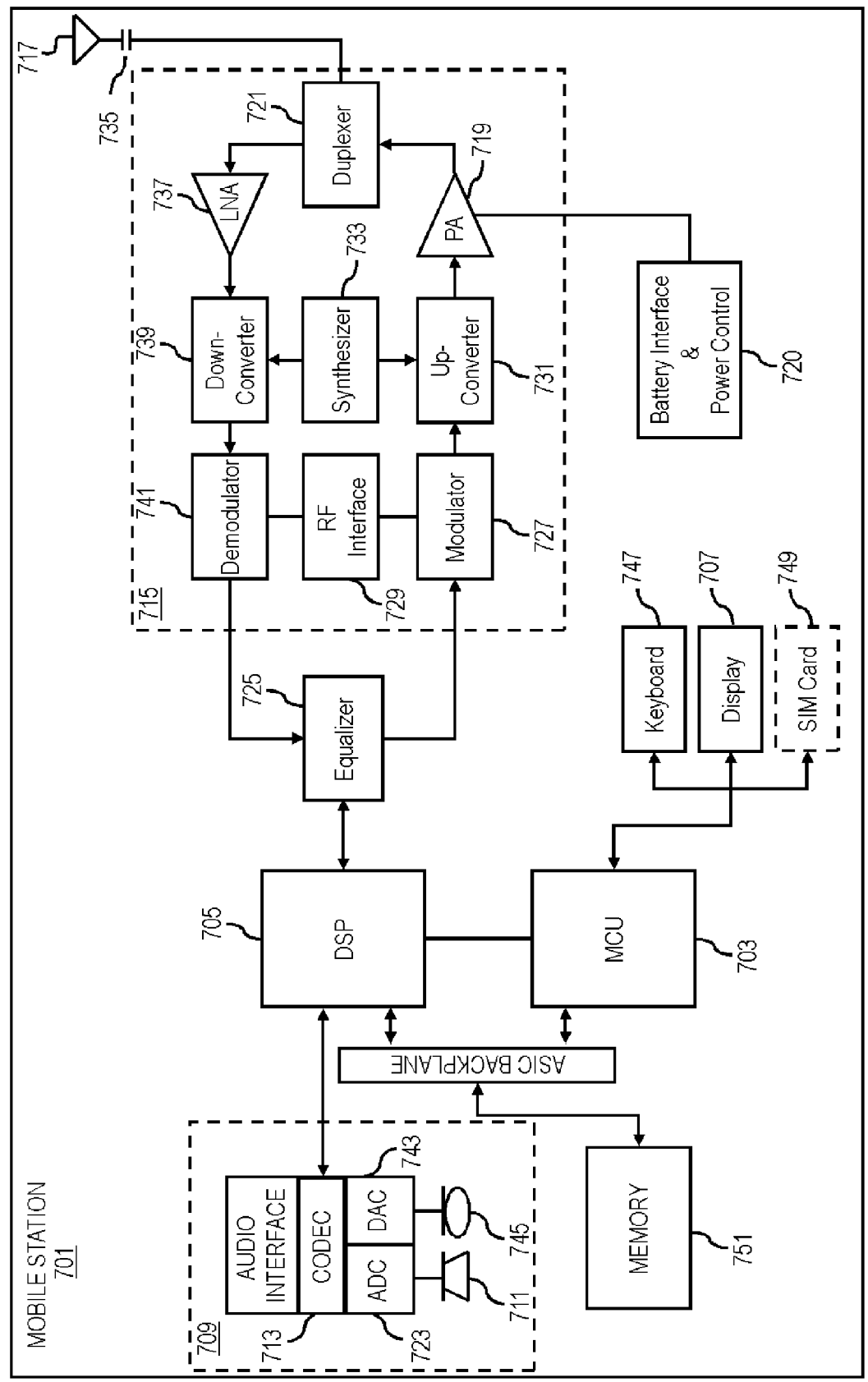

METHOD AND APPARATUS FOR SWITCHING DEVICES USING NEAR FIELD COMMUNICATION

RELATED APPLICATION

This application claims priority benefit to Indian Patent Application No. 2208/CHE/2009, filed Sep. 14, 2009.

BACKGROUND

Communication service providers (e.g., wireless, cellular, etc.) and device manufacturers are continually challenged to deliver value and convenience to consumers by, for example, providing compelling network services. Such challenges include coordinating and integrating online services for a user, particularly when the user can access those services from multiple devices. It is not uncommon for many users to carry or have access to more than one device for utilizing online services. Moreover, the user may switch among the multiple devices depending on the circumstances (e.g., user schedule, device capabilities, etc.). Therefore, there is a need for an approach for seamlessly and efficiently switching access to telecommunications services and online services among multiple devices.

SOME EXAMPLE EMBODIMENTS

According to one embodiment, a method comprises executing an online service by a first device. The method also comprises initiating communication, from the first device to a second device, over a near field communication link during the execution of the online service to coordinate the transfer of information relating to the online service. The method further comprises initiating the transfer of information relating to the online service to the second device for execution of the online service by the second device based on the communication.

According to another embodiment, an apparatus comprising at least one processor, and at least one memory including computer program code, the at least one memory and the computer program code configured to, with the at least one processor, cause the apparatus to execute an online service by the apparatus. The apparatus is also caused to initiate communication, from the apparatus to a device, over a near field communication link during the execution of the online service to coordinate the transfer of information relating to the online service. The apparatus is further caused to initiate the transfer of information relating to the online service to the device for execution of the online service by the device based on the communication.

According to further embodiment, a computer-readable storage medium carrying one or more sequences of one or more instructions which, when executed by one or more processors, execute an online service by an apparatus. The apparatus is also caused to initiate communication, from the apparatus to a device, over a near field communication link during the execution of the online service to coordinate the transfer of information relating to the online service. The apparatus is further caused to initiate the transfer of information relating to the online service to the device for execution of the online service by the device based on the communication.

According to another embodiment, an apparatus comprises means for executing an online service by the apparatus. The apparatus also comprises means for initiating communication, from the apparatus to a device, over a near field communication link during the execution of the online service to coordinate the transfer of information relating to the online service. The apparatus further comprises means for initiating the transfer of information relating to the online service to the device for execution of the online service by the device based on the communication.

According to one embodiment, a method comprises receiving a communication request at a first device over a near field communication link, wherein the communication request is for coordinating a transfer of information relating to an online service that is executing on a second device. The method also comprises accepting the communication request, over the near field communication link. The method further comprises receiving the transfer of information relating to the online service from the second device; and initiating execution of the online service by the first device after completion of the transfer of information relating to the online service.

According to another embodiment, an apparatus comprising at least one processor, and at least one memory including computer program code, the at least one memory and the computer program code configured to, with the at least one processor, cause the apparatus to receive a communication request at the apparatus over a near field communication link, wherein the communication request is for coordinating a transfer of information relating to an online service that is executing on a second device. The apparatus is also caused to accept the communication request, over the near field communication link. The apparatus is further caused receive the transfer of information relating to the online service from the device; and initiate execution of the online service by the apparatus after completion of the transfer of information relating to the online service.

According to yet another embodiment, a computer-readable storage medium carrying one or more sequences of one or more instructions which, when executed by one or more processors, cause an apparatus to receive a communication request at the apparatus over a near field communication link, wherein the communication request is for coordinating a transfer of information relating to an online service that is executing on a second device. The apparatus is also caused to accept the communication request, over the near field communication link. The apparatus is further caused to receive the transfer of information relating to the online service from the device; and initiate execution of the online service by the apparatus after completion of the transfer of information relating to the online service.

According to further embodiment, an apparatus comprises means for receiving a communication request at the apparatus over a near field communication link, wherein the communication request is for coordinating a transfer of information relating to an online service that is executing on a second device. The apparatus also comprises means for accepting the communication request, over the near field communication link. The apparatus further comprises means for receiving the transfer of information relating to the online service from the device; and means for initiating execution of the online service by the apparatus after completion of the transfer of information relating to the online service.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention.

Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3A is a flowchart of a process for transferring active services to another user equipment, according to one embodiment;

FIG. 4 is a ladder diagram of a process for transferring active services from a currently in use user equipment to another user equipment, according to one embodiment;

FIG. 7 is a diagram of a mobile terminal (e.g., handset) that can be used to implement an embodiment of the invention.

DESCRIPTION OF SOME EMBODIMENTS

A method and apparatus for switching devices using near field communication are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
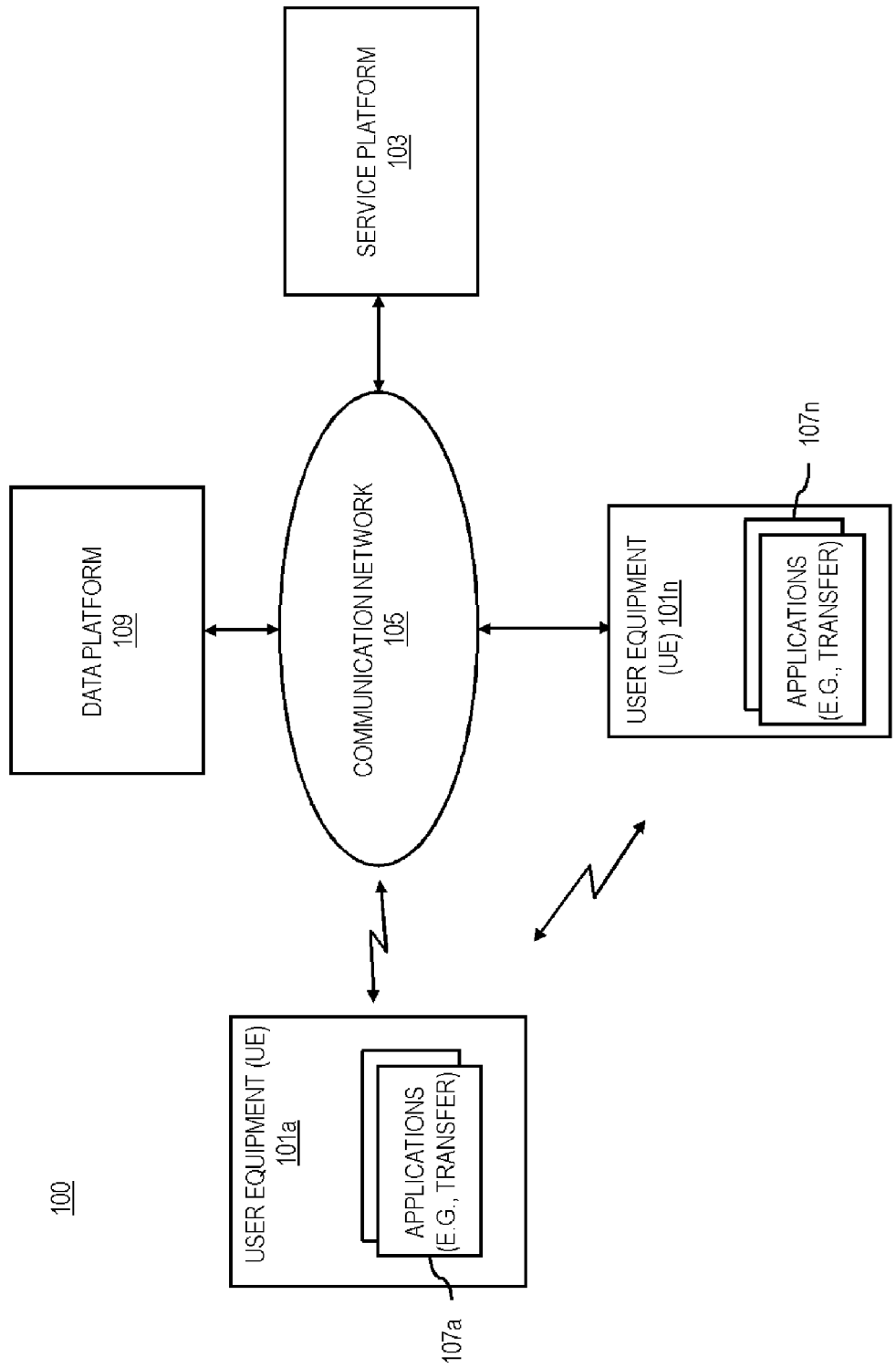
FIG. 1 is a diagram of a system capable of transferring active services from one user equipment to another user equipment, according to one embodiment.

FIG. 1 is a diagram of a system capable of transferring active services from one user equipment (UE) 101 to another user equipment 101, according to one embodiment. Many users of UEs 101 have multiple UEs 101, for example, a personal UE 101a as well as an office UE 101n. When a user arrives at work, a user may desire to transfer device activity from the user's personal UE 101a to the user's office UE 101n (e.g., the user can forward calls from the personal UE 101a to the office UE 101n, synchronize the user's personal information management data on the personal UE 101a with the office UE 101n, or transfer online services from the personal UE 101a to the office UE 101n). Similarly, when the user leaves work, the user may desire to transfer device activity back from the user's office UE 101n to the user's personal UE 101a. It can be inconvenient and time consuming for a user to transfer these activities from one UE 101 to another UE 101 while the user is arriving at or leaving a location by manually disconnecting and transferring a portion of the services available on the first UE 101a to the second UE 101n. For example, traditionally, a user would have to manually dial a forwarding code or enter a forwarding setting for each service the user wants to transfer from the first UE 101a to the second UE 101n.

To address this problem, a system 100 of FIG. 1 introduces the capability to transfer active online services from a first UE 101a to second UE 101n. As used here, the term "online services" refers to any services that can be provided for a user equipment by a service platform. The online services can be executed by an application of the user equipment with a connection via a communication network to the service platform. Examples of "online services" may include voice session services (e.g., a phone call, a voice over internet protocol session), a voice holding service (e.g., call waiting), a voice forwarding service (e.g., call forwarding), a messaging service (e.g., an instant messaging service, an e-mail service, a text messaging service, etc.), a shopping service, a social networking service, an online gaming service, and/or other services available online. It is contemplated that the approach described herein may be used with other online services not mentioned in the preceding examples.

For example, the UEs 101 may be configured by the user to associate with each other. More specifically, the user can set up an authentication or pairing between the two UEs 101 to enable the UEs 101 to transfer services. In one embodiment, the transfer can be quickly initiated by tapping the first UE 101a and the second UE 101n together. The tapping can, for instance, initiate a transfer exchanging identification information over a near field communication (NFC) link between the first UE 101a and the second UE 101n. The information transfer can include one or more identifiers (e.g., a Mobile Subscriber Integrated Services Digital Network Number (MSISDN), an International Mobile Subscriber Identity (IMSI), a wireless pairing identifier such as a BLUETOOTH address, or other UE 101 identifier that can be used by another device or network to identify the UEs 101). The first UE 101a and the second UE 101n can then utilize one of the identifiers to create a wireless link (e.g., a wireless local area network (WLAN) connection, a BLUETOOTH link, a network link over cellular communication, etc.) between the UEs 101. The wireless link can be authenticated using the identifiers, a preset username and password combination, a pin code, and/or other authentication mechanisms. The authentication information can be stored on the UEs 101 and transferred over the NFC link so that a user need not input information during the transfer process. Alternatively, the user may confirm the wireless link on one or both UEs 101. The wireless link can then be used to transfer details of active services from the first UE 101a to the second UE 101n. These transfer details can include information needed to forward active online services and or telecommunications services (e.g., voice calls, text messages, etc.) from the first UE 101a to the second UE 101n.

Under the scenario of FIG. 1, the system 100 involves UEs 101a-101n having connectivity to a service platform 103 via a communication network 105. The UE 101 can utilize a transfer application 107 to transfer active communications from a first UE 101a to a second UE 101n. The transfer application 107a of the first UE 101a can be set to a mode to initiate a transfer while the transfer application 107n of the second UE 101n can be set to a mode to receive a transfer. The transfer application 107a of the first UE 101a can also store user data on a data platform 109 via the communication network 105. The transfer application 107a of the first UE 101a can then send a message to the second UE 101n to inform the second UE 101n that the user data is available on the data platform 109 for the second UE 101n to retrieve. Next, the second UE 101n can retrieve the user data from the data platform 109 via the communication network 105.

In one embodiment, the system 100 includes a service platform 103. The service platform 103 can include various services for UEs 101, for instance, the service platform 103 can include a voice session service (e.g., a phone call, a voice over internet protocol session), a voice holding service (e.g., call waiting), a voice forwarding service (e.g., call forwarding), a messaging service (e.g., an instant messaging service, an e-mail service, a text messaging service, etc.), a music service, a sports tracker service, and/or other online services (e.g., a shopping service or a social service). Additionally more than one service platform 103 can be available to UEs 101 to provide the various services. In one embodiment, the service platform 103 has connectivity to each of the UEs 101 via the communication network 105. A first UE 101a can request that the connection between the first UE 101a and the service platform 103 be transferred to a second UE 101n that can be identified by the first UE 101a using, for instance, an identifier (e.g., a MSISDN identifier, an IMSI identifier, an internet protocol address, etc.). The second UE 101n may also request that a current connection between the connection module and the first UE 101a be transferred to the second UE 101n using an identifier and/or other authentication information retrieved from the first UE 101a.

In one embodiment, the system 100 includes a data platform 109. The data platform 109 can be accessed by both the first UE 101a and the second UE 101n over, for instance, the communication network 105. Either UE 101 can transfer data to the data platform 109 for receipt by the other UE 101. The data platform 109 can require authentication that can be set up by either UE 101. It is contemplated that the data platform 109, the UEs 101, as well as the service platform 103 may employ any authentication mechanism (e.g., username/password, network address filtering, biometric security, etc.) to ensure that only authorized users are able to access the services of the system 100. A location of the data platform 109 and the authentication information can be communicated to the other UE 101 by a NFC link, another wireless link, or a message (e.g., via a short message service (SMS)). Additionally, the data platform 109 can be connected to a local network or an external network (e.g., via the internet) for access by the UEs 101.

As shown in FIG. 1, the system 100 comprises a user equipment (UE) 101 having connectivity to a service platform 103 or a data platform 109 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UEs 101, service platform 103, and data platform 109 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
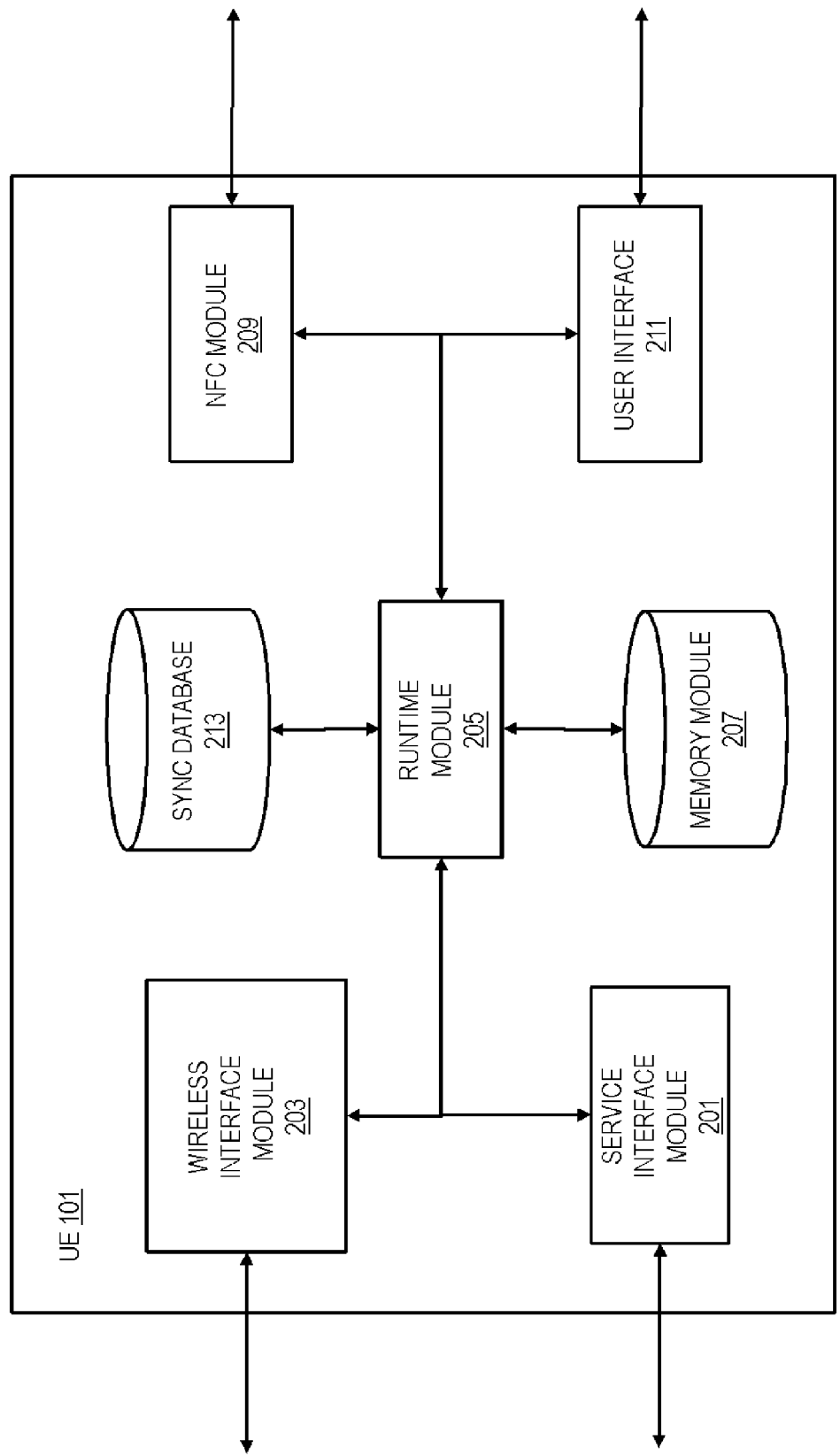
FIG. 2 is a diagram of the components of a user equipment, according to one embodiment.

FIG. 2 is a diagram of the components of a user equipment 101, according to one embodiment. By way of example, the UE 101 includes one or more components for transferring services and functionality between UEs 101. It is contemplated that the functions of these components may be combined in one or more components or performed by other components of equivalent functionality. In this embodiment, the UE 101 includes a service interface module 201, a wireless interface module 203, a runtime module 205, a memory module 207, a NFC module 209, a user interface 211, and a synchronization (or "sync") database 213.

In one embodiment, the runtime module 205 executes a transfer application 107 to transfer an online service from a first UE 101a to a second UE 101n. The transfer application 107a of the first UE 101a can be set to an initiate transfer mode while the transfer application 107n of the second UE 101n can be set to a receive transfer mode. A user can tap the first UE 101a to the second UE 101n to initiate transfer of the online service from the first UE 101a to the second UE 101n. In one embodiment, the UEs 101 may detect the tapping using accelerometers or other movement sensors coupled with one or more mechanism to detect the proximity of the UEs 101 (e.g., short range radio such as BLUETOOTH or location information from global positioning satellite receivers and the like). When the two UEs 101 are tapped together, an NFC module 209 from each UE 101 can be activated to create an NFC link between the two UEs 101 to transfer information (e.g., identity and authentication information). The transferred information can be stored in a memory module 207. The NFC module 209 can include an interface to components for conducting NFC and/or the components themselves. NFC technology is a short-range technology that enables two-way interactions between devices. NFC technology can be used to communicate with smartcards, readers, and other NFC devices (e.g., another UE 101). NFC can utilize a magnetic field induction (e.g., using antennas) to communicate with other NFC devices that are located within a certain distance. A NFC device can transmit on a radio band (e.g., the radio band of 13.56 MHz). In one implementation, two UEs 101 can use an active NFC communication mode. Both UEs 101 can communicate with each other by generating a radio frequency field.

A portion of the information transferred via the NFC link may then utilized by the transfer application 107a of the first UE 101a to setup a wireless connection link (e.g., a WLAN, a BLUETOOTH link, a network link over cellular communication, etc.) via a wireless interface module 203 of each UE 101. The wireless interface module 203 can include physical components to transmit data over the wireless connection link as well as a software component. The wireless interface module 203 may include an identifier that identifies the wireless interface module 203 to other devices to allow for communication. A portion of the information transferred via the NFC link can include the identifier for one or both UEs 101. The transfer application 107a of the first UE 101a can use the identifier to create the wireless connection link. The wireless connection link can be utilized to transfer details of any active or inactive online services from the first UE 101a to the second UE 101n. Active online services can include voice over internet protocol sessions, messaging services, games, e-mail, or other like online services. The details of the online services can include a service identifier, a service location, service authentication information, the current service state, session information, and other service details that can be used to transfer an online service from the first UE 101a to the second UE 101n.

An active application running on the runtime module 205 of the UE 101 can utilize the service interface module 201 to interact with the service platform 103 or the data platform 109. The service interface module 201 can utilize services from the service platform 103 that a user can use via, for instance, the user interface 211. Exemplary services can include voice sessions, an instant messaging session, a gaming session, etc. The service interface module 201 may also be used to transfer data to a data platform 109 which provides a data storage service. The first UE 101a can store user session data at the data platform 109 for the second UE 101n to retrieve. In some instances, the transfer of active application session data occurs during the transfer process between the first UE 101a and the second UE 101n. The transfer of the data can be completed before or after the second UE 101n is online with the service.

Additionally, the sync database 213 of the first UE 101a can store user data corresponding to online applications or services. The sync database information of the first UE 101a can be transmitted via the service interface module 201 to the data platform 109. The sync database information can then be retrieved by the second UE 101n via a service interface module 201 of the second UE 101n. The sync database 213 can store user data (e.g., user identifiers, application state information, a partially-written e-mail information, saved game state information, or other interesting information) involving the online applications or services. Additionally, the second UE 101n can retrieve information from the sync database 213 of the first UE 101a via the wireless interface module 203 and the transfer application 107n running on the runtime module 205 of the second UE 101n.

Additionally, the user interface 211 of the UE 101 can include various methods of communication. For example, the user interface 211 can include outputs including a visual component (e.g., a screen), an audio component (e.g., amplifiers and speakers), a physical component (e.g., vibrations), and other methods of communication. User inputs can include a touch-screen interface, a scroll-and-click interface, a button interface, a microphone, etc. A user can utilize services from the service platform 103 using, for instance, applications 107 of the UE 101. Additionally, a user can input information to coordinate actions between transfer applications of two UEs 101 using the UE 101.

FIG. 3A is a flowchart of a process for transferring active services from one user equipment to another user equipment, according to one embodiment. In one embodiment, the runtime module 205 of a UE 101 performs the process 300 and is implemented in, for instance, a chip set including a processor and a memory as shown FIG. 6. A user of a transferring UE 101a (e.g., a UE 101a initiating the transfer of active online services) can determine that the user desires to transfer use and active applications of the transferring UE 101a to a receiving UE 101n (e.g., a UE 101n receiving the transfer of active online services). The user can indicate the desire to transfer use via a transfer application 107.

At step 301, the runtime module 205 transferring UE 101a executes an online service via, for instance, an application. The execution of the online service can utilize the services (e.g., a voice session service, an instant messaging service, a gaming service, etc.) of one or more service platforms 103. The user can indicate that the user desires to transfer use of the functions of the transferring UE 101a, including the online service, to the receiving UE 101n via initiating the transfer application 107. In one embodiment, the transfer application 107 can be initiated by simply tapping the transferring UE 101a with the receiving UE 101n configured to receive transferred services. Alternatively, the transfer application 107 can be initiated via other user interface 211 inputs. For example, when the transferring UE 101a is within a certain distance from the receiving UE 101n, the user interface 211 of the transferring UE 101a may display an option to transfer functionality to the receiving UE 101n. The proximity of the two UEs 101 may be determined by, for instance, using short range radio (e.g., BLUETOOTH, WIFI) or location-based services (e.g., GPS, cellular triangulation, etc.).

In one embodiment, the user can input which functions the user desires to transfer to the receiving UE 101n or that the user desires to transfer all functions from the transferring UE 101a to the receiving UE 101n. In addition or alternatively, the user may pre-configure which functions to transfer via a profile that can be stored in the memory module 207 of the transferring UE 101a so that the transfer can occur with no user interaction. This profile can be transferred to the receiving UE 101n as user data. Additionally, the profile can choose which functionality to transfer or activate from the transferring UE 101a to the receiving UE 101n based on the type (e.g., personal device, office device, automobile device, etc.) of device each UE 101. For example, the user may not desire to transfer personal instant messaging functions to an office device, but would want transfer personal instant messaging functions to the user's automobile device. Thus, the profile of the transferring UE 101a can be set to transfer instant messaging functions based on the device type. Additionally, the device type may influence the priority of which services are activated or transferred. For example, it may be more important to transfer a voice session features from a personal device to an automobile device before transferring instant messaging features.

In another embodiment, the profile can be based on and updated via the historical use of the devices by the user or based on an application. Historical data regarding the user's usage of online services can be collected by the UEs 101. Analysis of the data by the runtime module 205 can select or recommend which online services should be activated and/or transferred on the receiving UE 101*n*. For example, data can be collected that the user activates a music application or a sports tracking application when transferring from the transferring UE 101*a* to the receiving UE 101*n* on Wednesday evenings. The profile can then be set by the runtime module 205 to initiate activation of the music or sports tracking application on the receiving UE 101*n* on Wednesday evenings. Additionally, the profile can be set to utilize the historical usage in setting the priority order of transferring or activating services. An application (e.g., a calendar application) on the transferring UE 101*a* can also have access to the profile. The application can determine which online services should be activated and/or transferred based on pre-set configurations. For example, a calendar application can have a scheduled golfing appointment on Friday at 3 pm. The calendar application can set the profile to activate a golfing online service (e.g., to collect golfing data of the user and provide guidance) during a set time frame if a transfer occurs during this time frame.

Next, at step 303, the runtime module 205 of the transferring UE 101*a* (e.g., a device) initiates communication to the receiving UE 101, over an NFC link during the execution of the online service application. In this example, the communication is for coordinating the transfer of information relating to the active online service to another device (e.g., the receiving UE 101*n*). The transferring UE 101*a* can establish communication via a NFC module 209. The receiving UE 101*n* can receive a communication request from the transferring UE 101*a* and complete the NFC link. The NFC link enables the transfer of information between the transferring UE 101*a* to the receiving UE 101*n*. The transferring UE 101*a* and the receiving UE 101*n* can then, over the NFC link, exchange (e.g., send and receive) identifiers (e.g., a MSISDN identifier, an IMSI identifier, and/or a wireless pairing identifier (e.g., a BLUETOOTH identifier)) that can be used to establish a wireless connection link between the transferring UE 101*a* and the receiving UE 101*n*. Examples of a wireless connection link can include a BLUETOOTH link, a WLAN link, or a network link over cellular communication. The wireless connection link can be established via the runtime module 205 and wireless interface module 203 of each UE 101.

Further, at step 305, the runtime module 205 of the transferring UE 101*a* initiates transfer of information relating to the online service to the receiving UE 101*n* for execution of the online service application by the receiving UE 101*n*. The runtime module 205 of the receiving UE 101*n* receives the information relating to the online service that is executing on the transferring UE 101*a*. The transfer of information relating to the online service can be over the wireless connection link or the NFC link. The information relating to the online service can include, for example, service name information, service location information, service authentication information, and/or other information that can be used to transfer access to the online service from the transferring UE 101*a* to the receiving UE 101*n*.

Additionally, at step 307, transfer of user data associated with the online service can be initiated by the runtime module 205 of the transferring UE 101*a* to the receiving UE 101*n*. In one embodiment, the transferring UE 101*a* can initiate a synchronization sequence with a data platform 109 (e.g., a backend server) that can keep the data platform 109 up to date with current user data (e.g., updated user information, online service temporary data, online service user data, etc.). Once the upload is complete, the runtime module 205 of the transferring UE 101*a* can send a notification (e.g., an SMS, a notification packet to the transfer application 107 of the receiving UE 101*n*, etc.) to the receiving UE 101*n* that the data platform 109 has the current user data information. Under one scenario, the transferring UE 101*a* may also deactivate any alarms set on the transferring UE 101*a* and set the transferring UE 101*a* to an offline mode. The notification can additionally include location and authentication information about the data platform 109 for the receiving UE 101*n* to retrieve the user data. The user data may be used to facilitate a seamless transfer of the online service from the transferring UE 101*a* to the receiving UE 101*n*. Additionally, a synchronization feature of the transfer application 107 can be used to transfer user data directly from the transferring UE 101*a* to the receiving UE 101*n*.

In one embodiment, the runtime module 205 of the transferring UE 101*a* initiates transfer of the online service to the receiving UE 101*n*. The runtime module 205 of the transferring UE 101*a* can use identifiers about the receiving UE 101*n* (e.g., a MSISDN identifier, an IMSI identifier, a web address, etc.) to initiate transfer of the online service from the transferring UE 101*a* to the receiving UE 101*n*. In this embodiment, at step 309, the runtime module 205 of the transferring UE 101*a* can generate a request to transfer the online service (e.g., a voice session) to the receiving UE 101*n* using an identifier of the receiving UE 101*n*. Then, at step 311, the runtime module 205 of the transferring UE 101*a* initiates transmission of the request to a service platform 103 configured to provide the online service. The service platform 103 can then forward all incoming data associated with the voice session to the receiving UE 101*n*. The runtime module 205 of the transferring UE 101*a* can send a notification to the receiving UE 101*n* before and after the transfer request transmission to enable the receiving UE 101*n* to prepare to receive the online service. The voice session can then be transferred to the receiving UE 101*n*, which can execute the voice session. In another embodiment, the online service can be a phone call. In various embodiments, the phone call is over a voice over internet protocol, other packet data calling mechanisms (e.g., Push-to-Talk, session initiation protocol, etc.) Additionally, the phone call can include point-to-point calls and/or group calls. The runtime module 205 of the transferring UE 101*a* can initiate a call forwarding transfer from the transferring UE 101*a* to the receiving UE 101*n* using a service platform 103 for phone calls. An MSISDN identifier, an IMSI identifier, or a similar identifier may be used to transfer the phone calls. If a phone call is active, the runtime module 205 of the transferring UE 101*a* may initiate a request for the service platform 103 to initiate a call waiting service while the phone call is being transferred from the transferring UE 101*a* to the receiving UE 101*n*. Once the transferring UE 101*a* completes its portions of the transfer, the transferring UE 101*a* can be deactivated or placed in an offline mode (e.g., a power saving mode) (step 313).

According to the above approach, a user is able to switch user devices from a transferring UE 101*a* to a receiving UE 101*n* in an intuitive, quick fashion. In this manner, a user can utilize multiple UEs 101 during daily use. Additionally, this allows a user to save time and effort because the user need not manually disconnect and transfer functionalities of the transferring UE 101*a* to the receiving UE 101*n*. Further, this improves battery life of UEs 101 because only one UE 101 need be active at a time.

Figure 3B:
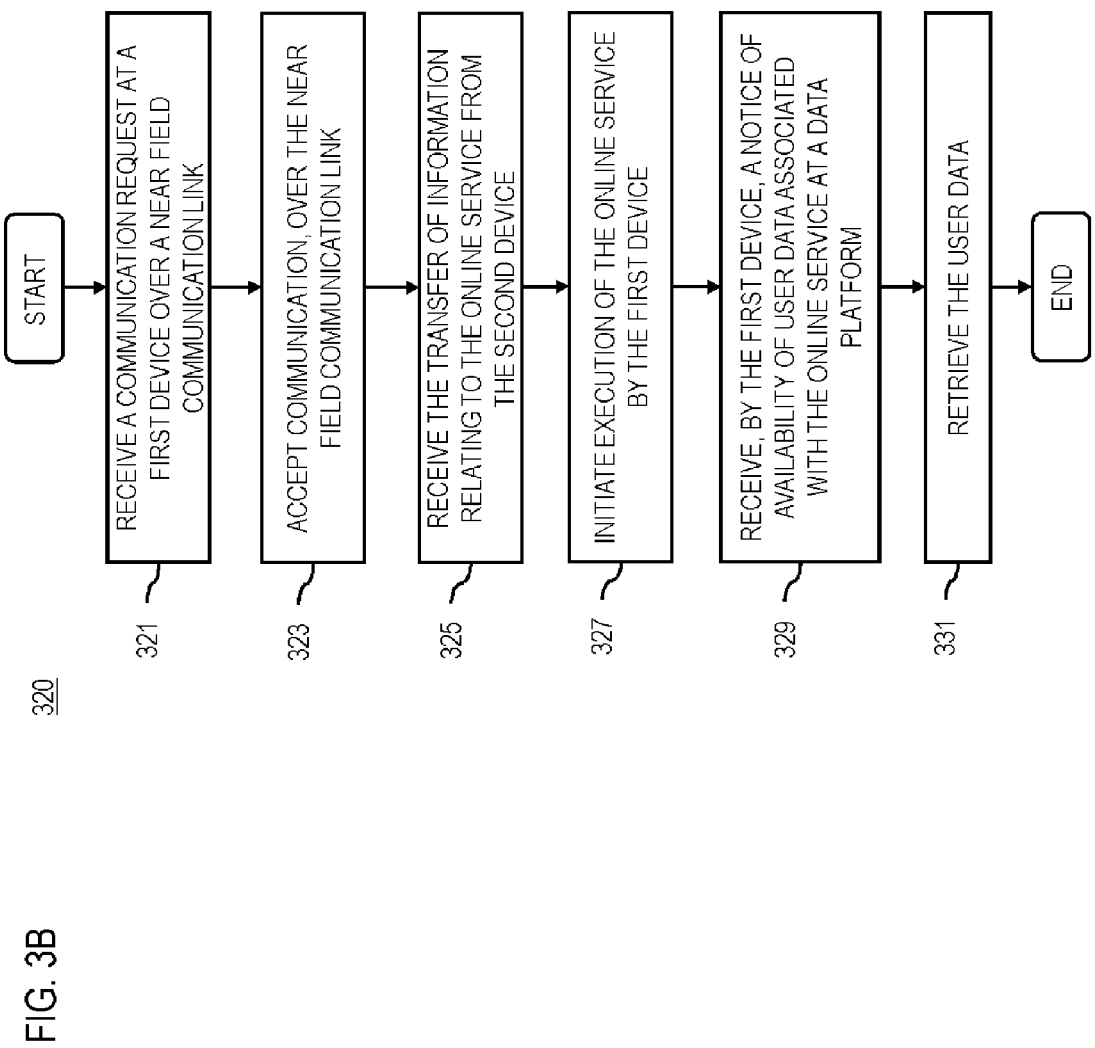
FIG. 3B is a flowchart of a process for receiving active services transferred from another user equipment, according to one embodiment.

FIG. 3B is a flowchart of a process for receiving active services from one user equipment to another user equipment, according to one embodiment. In one embodiment, the runtime module 205 of a UE 101 performs the process 320 and is implemented in, for instance, a chip set including a processor and a memory as shown FIG. 6. The process 320 assumes that a transfer of active services has already been initiated by a transferring UE 101*a* as described with respect to FIG. 3A. At step 321, the runtime module 205 of the receiving UE 101*n* (e.g., a device) receives a communication request from the transferring UE 101*a* over, for instance, a near field communication link. In one embodiment, the communication request is received in order to coordinate the transfer of information relating to active services that are being transferred from another device (e.g., the transferring UE 101*a*) that is currently executing those services. By way of example, the acceptance process includes exchanging wireless communication identifiers (e.g., a MSISDN identifier, an IMSI identifier, and/or a wireless pairing identifier (e.g., a BLUETOOTH identifier)) that can be used to establish a wireless connection link (e.g., a BLUETOOTH link, WLAN link, network link over cellular communication, etc.). In one embodiment, the UEs 101*a* and 101*n* use the wireless connection to complete the transfer of information related to the active services. In addition or alternatively, the transfer of information may be completed entirely of the near field communication link.

After establishing the transfer communication link (e.g., the wireless connection link and/or the near field communication link), the runtime module 205 of the receiving UE 101*n* receives the transfer of information relating to an online service executing on the transferring UE 101*a* (step 325). The information relating to the online service can include, for example, service name information, service location information, service authentication information, and/or other information that can be used to transfer access to the online service from the transferring UE 101*n* to the receiving UE 101*n*. In some embodiments, the information includes instructions to activate an online service based on a profile of the transferring UE 101*a*.

Next, at step 327, the runtime module 205 of the receiving UE 101*n* can initiate execution of the online service to be transferred or activated. In one embodiment, the receiving UE 101*n* can connect to a service platform 103 associated with the online service based on the transferred information relating to the online service. The runtime module 205 of the receiving UE 101*n* can then authenticate with the service platform 103 based on the transferred information relating to the online service. Then, the receiving UE 101*n* may execute the online service. According to one scenario, the online service is an instant messaging service. The runtime module 205 of the receiving UE 101*n* may use the transfer information to log onto the instant messaging service. The runtime module 205 of the receiving UE 101*n* can then synchronize the current session with the user data before or after logging onto the instant messaging service. This allows for a seamless transition from using the transferring UE 101*a* to using the receiving UE 101*n*. When the online service is transferred to the receiving UE 101*n*, the transferring UE 101*a* can logout of the online service. The logout can be before or after the receiving UE 101*n* initiates execution of the online service depending on the service and service parameters (e.g., some online service parameters only allow one UE 101 to be actively connected to the service). Once the transferring UE 101*a* logs out of all online services, the transferring UE 101*a* can be placed in an offline mode.

In one embodiment, the online service can be a phone call. The runtime module 205 of the receiving UE 101*n* can receive notification of incoming call forwarding from the transferring UE 101*a*. The runtime module 205 of the receiving UE 101*n* can then deactivate any active call forwarding from the receiving UE 101*n* to allow for phone calls to be forwarded directly to the receiving UE 101*n*. An MSISDN identifier, an IMSI identifier, or a similar identifier may be used to transfer the phone calls. If a phone call is active, the runtime module 205 of the receiving UE 101*n* may initiate a request for the service platform 103 to initiate a call waiting service while the phone call is being transferred from the transferring UE 101*a* to the receiving UE 101*n*.

At step 329, the runtime module 205 of the receiving UE 101*n* receives a notification (e.g., an SMS, notification data via the wireless connection link, etc.) of availability of user data associated with the online service at a data platform 109. The notification can additionally include location information and authentication information about the data platform 109. Then, at step 331, the receiving UE 101*n* can retrieve the user data. In one embodiment, the receiving UE 101*n* can initiate a synchronization sequence with the data platform 109 (e.g., a backend server) to retrieve the information from the data platform 109. The data platform 109 can be up to date with current user data (e.g., updated user information, online service temporary data, online service user data, etc.) by synchronizing with the transferring UE 101*a* before synchronizing with the receiving UE 101*n*. The runtime module 205 of the transferring UE 101*a* can then retrieve the user data. The user data may be used to help create a seamless transfer of the online service from the transferring UE 101*a* to the receiving UE 101*n*. Additionally, a synchronization feature of the transfer application 107 can be used to transfer user data directly from the transferring UE 101*a* to the receiving UE 101*n* without a separate data platform 109.

Utilizing the above approach, a user is able to receive user functionality at a receiving UE 101*n* from a transferring UE 101*a* via NFC. The user is saved time and effort of manually transferring portions of the functionality of one UE 101*a* to another UE 101*n*. Additionally, battery life of UEs 101 is improved using power saving modes because only one UE 101 need be in use at a time.

FIG. 4 is a ladder diagram of a process for transferring active services from a currently in use first UE 101*a* to a second UE 101*n* to be used, according to one embodiment. The runtime module 205 in conjunction with other UE 101 components can be utilized during the transfer process. Even though the UEs 101 are referred to in reference to FIG. 4, it should be understood that components of the UEs 101 perform the steps of the processes. At step 401 the second UE 101*n* can be preconfigured to be in a wait for and receive device transfer information state via executing a device transfer application 107*n*. This state can additionally be a power-saving state. Then at step 403, the user can tap the first UE 101*a* and the second UE 101*n* together to initiate a NFC link between the two UEs 101. The NFC link can be initiated by a runtime module 205 of each UE 101 via a NFC module 209. Then, at step 405, the NFC link is used to send identifiers (e.g., a MSISDN number, an IMEI number, and/or a BLUETOOTH identifier) and/or authentication information from each UE 101 to the other UE 101. Additionally, at step 407, the second UE 101*n* can activate itself to an online mode from the power-saving state if the second UE 101*n* is in a power-saving state.

Then, at step 409, the runtime module 205 of the first UE 101a and the runtime module 205 of the second UE 101n can authenticate with each other using either the identifiers transmitted and/or the authentication information transmitted to set up a wireless connection link (e.g., a BLUETOOTH connection) between the two UEs 101. Once the wireless connection link is made, the data transfer can be completed at a range of the wireless connection link. In some instances, the UEs 101 can be preconfigured to recognize each other and accept a connection based on the identifiers (e.g., the MSISDN number or IMEI number). Once the devices have authenticated with each other, at step 411, the runtime module 205 of the first UE 101a can transfer data about any active online services that the first UE 101a is executing to the second UE 101n.

Next, at step 413, the runtime module 205 of the first UE 101a can initiate a transfer of an ongoing call to the second UE 101n. The runtime module 205 of the first UE 101a can generate and send a request to a service platform 103 associated with the ongoing call to transfer the ongoing call to the second UE 101n by sending authentication information and identifiers (e.g., the received MSISDN identifier or received IMSI identifier) of the second UE 101n to the service platform 103. The service platform 103 can then transfer the ongoing call to the second UE 101n. The service platform 103 may initiate connection to the second UE 101n before disconnecting the first UE 101a from the call. This transfer may additionally transfer a mobile service subscription from being associated with the first UE 101a to being associated with the second UE 101n.

At step 415, the runtime module 205 of the first UE 101a may logout of all active services and at step 417, the runtime module 205 of the second UE 101n can go online to the services active on the first UE 101n using the details received in step 411. In one exemplary scenario, the runtime module 205 of the first UE 101a logs out of all active services before the transfer, in another exemplary scenario the runtime module 205 of the first UE 101a logs out of all active services after the second UE 101n begins execution of the online services and notifies the first UE 101a of successful execution. The runtime module 205 of the second UE 101n authenticates with a service platform 103 associated with each online service using the received transfer details. Once online, the runtime module 205 of the second UE 101n can send a communication to the first UE 101a that the second UE 101n is successfully executing the online service.

In one embodiment, at step 419, the second UE 101n can deactivate any call forwarding that is set on the second UE 101n in preparation for receiving call forwarding from the first UE 101a. Then, at step 421, the first UE 101a initiates call forwarding to the second UE 101n. The first UE 101a can initiate transmission to a service platform 103 associated with calls of a request to forward calls to the second UE 101n. The request can be generated using identifiers received from the second UE 101n.

In another embodiment, at step 423, the runtime module 205 of the first UE 101a synchronizes user data with a data platform 109. The runtime module 205 of the first UE 101a then initiates notification to the second UE 101n that the synchronized data is available to access from the data platform 109. This notification may also include a location and authentication information for the data platform 109, or this information can be transferred earlier in step 411. Then, at step 425, the second UE 101n receives the notification and begins synchronizing with the data platform 109 by downloading user data. The user data can include personal information management data such as calendar information, personal e-mail information, and/or online service user data. Under some scenarios, a portion of the user data, or all of the user data can be synchronized. In other scenarios, the UEs 101 need not synchronize because there is no updated information to synchronize or because the updated data is not time critical. Additionally, or alternatively, the synchronization can occur directly from the first UE 101a to the second UE 101n via the wireless connection link. Once the first UE 101a transfers the user data to the data platform 109 or the second UE 101n, the first UE 101a may set itself to an offline or low-power mode.

With to the above approach, a user is able to transfer user functionality from a first UE 101a to a second UE 101n via NFC. This allows a user to save time and effort because the user need not manually attempt to transfer only a small amount of functionality from the first UE 101a to the second UE 101n. According to the above approach, battery life of UEs 101 is improved utilizing power saving modes when functionality is transferred to another UE 101.

The processes described herein for transferring active services from one UE 101 to another UE 101 may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
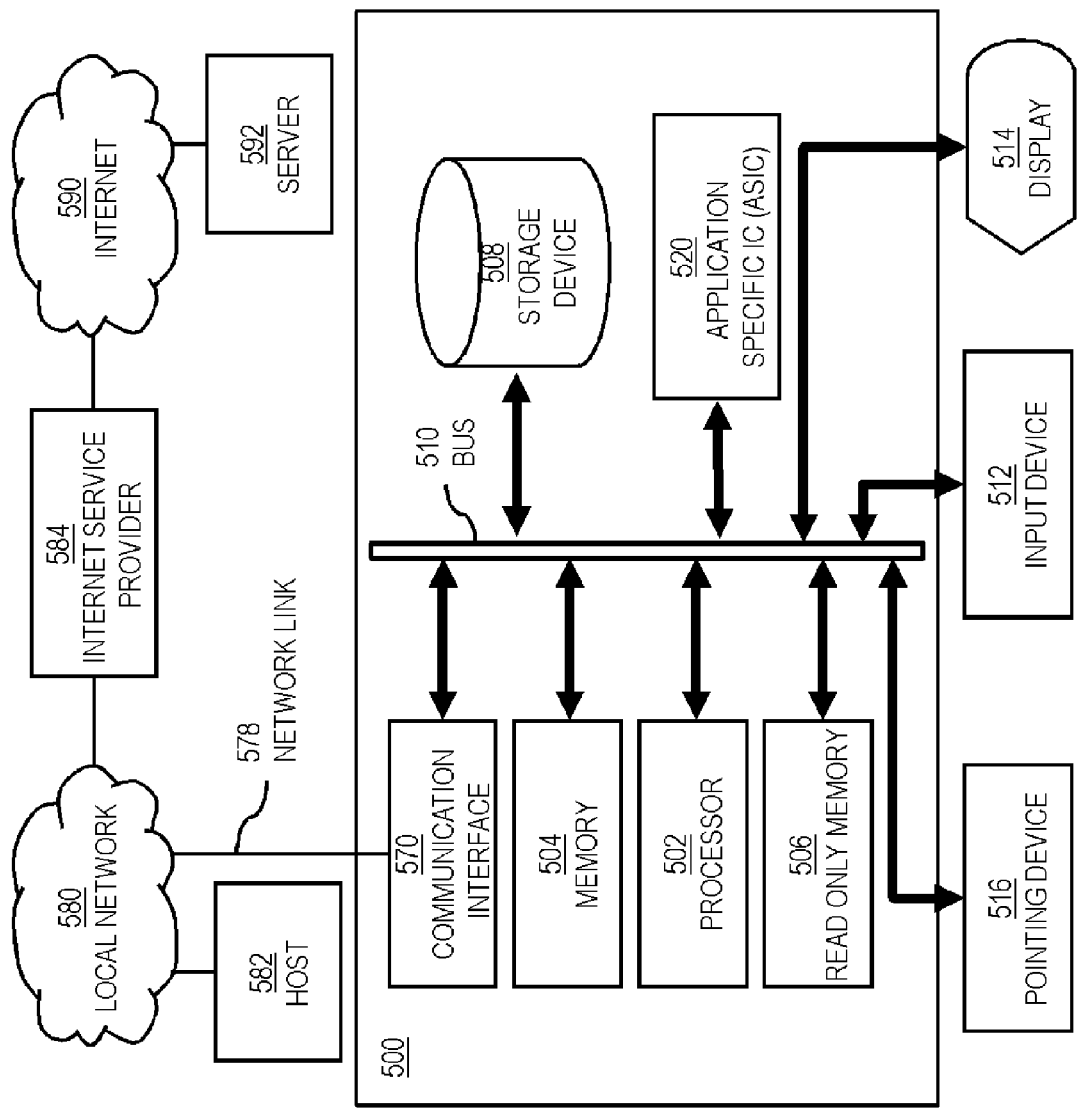
FIG. 5 is a diagram of hardware that can be used to implement an embodiment of the invention.

FIG. 5 illustrates a computer system 500 upon which an embodiment of the invention may be implemented. Computer system 500 is programmed (e.g., via computer program code or instructions) to transfer active services from one UE 101 to another UE 101 as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof constitutes a means for performing one or more steps of transferring active services from one UE 101 to another UE 101.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to transfer active services from one UE 101 to another UE 101. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for transferring active services from one UE 101 to another UE 101. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for transferring active services from one UE 101 to another UE 101, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for the UE 101.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server host 592 connected to the Internet hosts a process that provides a service in response to information received over the Internet. For example, server host 592 hosts a process that provides information representing video data for presentation at display 514.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
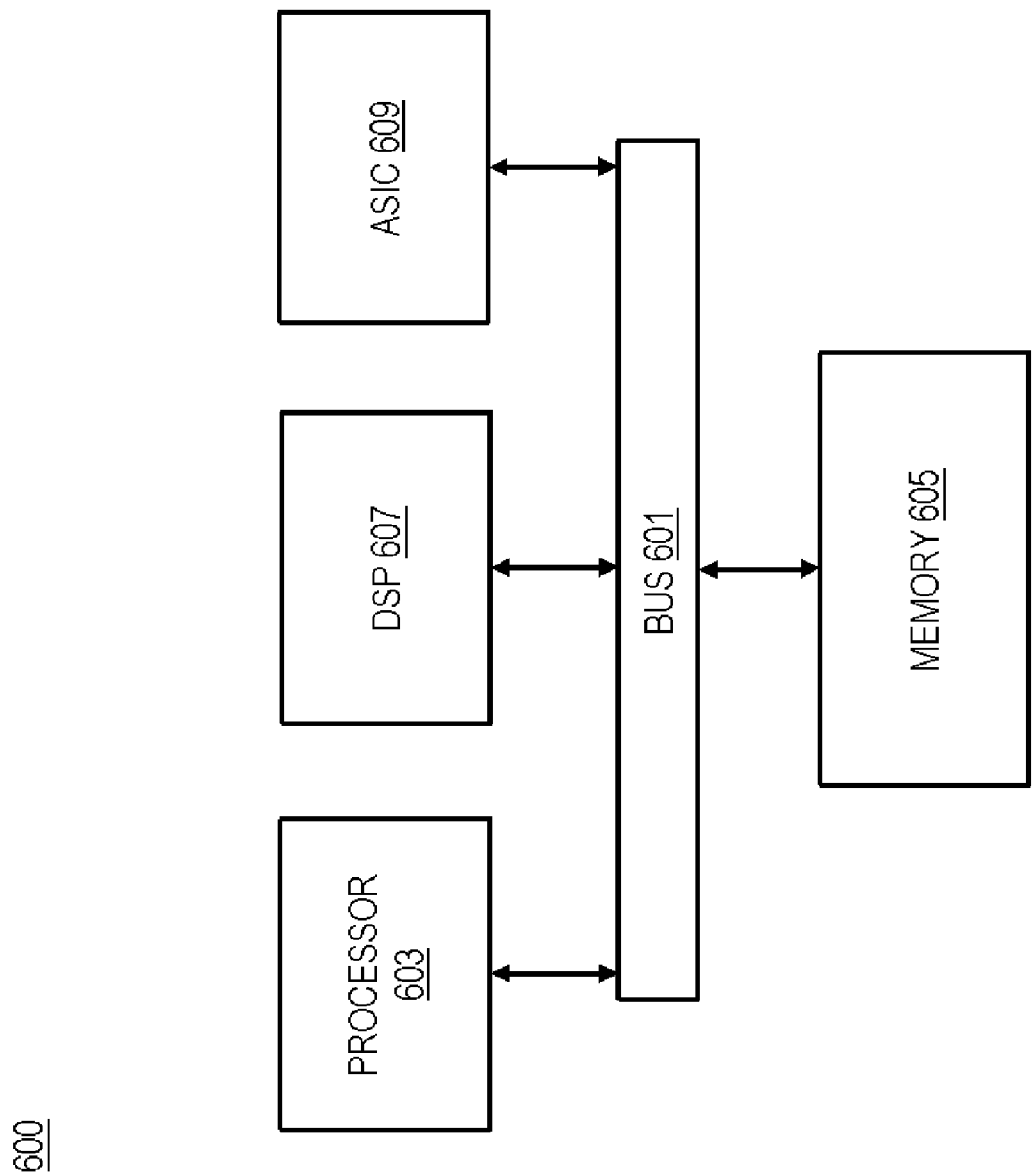
FIG. 6 is a diagram of a chip set that can be used to implement an embodiment of the invention.

FIG. 6 illustrates a chip set 600 upon which an embodiment of the invention may be implemented. Chip set 600 is programmed to transfer active services from one UE 101 to another UE 101 as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of transferring active services from one UE 101 to another UE 101.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to transfer active services from one UE 101 to another UE 101. The memory 605 also stores the data associated with or generated by the execution of the inventive steps.

FIG. 7 is a diagram of exemplary components of a mobile terminal (e.g., handset) for communications, which is capable of operating in the system of FIG. 1, according to one embodiment. In some embodiments, mobile terminal 700, or a portion thereof, constitutes a means for performing one or more steps of transferring active services from one UE 101 to another UE 101. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of transferring active services from one UE 101 to another UE 101. The display unit 707 includes display circuitry configured to display at least a portion of a user interface of the mobile terminal (e.g., mobile telephone). Additionally, the display unit 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to transfer active services from one UE 101 to another UE 101. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
executing an online service by a first device;
initiating communication, from the first device to a second device, over a near field communication link during the execution of the online service to coordinate the transfer of information relating to the online service; and
initiating the transfer of information relating to the online service to the second device based on the communication for execution of the online service by the second device independently from the first device.

2. A method of claim 1, further comprising:
initiating transfer, from the first device to the second device, of a first wireless communication identifier associated with the first device to the second device over the near field communication link;
receiving, by the first device, a second wireless communication identifier associated with the second device over the near field communication link; and
initiating establishment of a wireless connection link based on the first wireless communication identifier and the second wireless communication identifier.

3. A method of claim 2, wherein the transfer of information relating to the online service is over the wireless connection link.

4. A method of claim 2, wherein the online service is a voice session, the method further comprising:
generating a request to transfer the voice session to the second device using the second wireless communication identifier; and
initiating transmission of the request to a platform configured to provide the online service.

5. A method of claim 2, wherein the first and/or the second wireless communication identifier includes one or more of a mobile subscriber integrated services digital network number, an international mobile equipment identity, or a wireless pairing identifier.

6. A method of claim 1, further comprising:
initiating transmission of user data associated with the online service to a data platform for access by the second device; and
deactivating the first device after completion of the transfer of information relating to the online service.

7. A method of claim 1, wherein the online service is provided via a data network from a service platform to the first device, and then the online service is provided via the data network from the service platform to the second device.

8. An apparatus comprising:
at least one processor; and at least one memory including computer program code for one or more programs, the at least one memory and the computer program code configured to, with the at least one processor, cause the apparatus to perform at least the following: execute an online service by the apparatus;
initiate communication, from the apparatus to a device, over a near field communication link during the execution of the online service to coordinate transfer of information relating to the online service; and
initiate the transfer of information relating to the online service to the device based on the communication for execution of the online service by the device independently from the apparatus.

9. An apparatus of claim 8, wherein the apparatus is further caused to:
initiate transfer, from the apparatus to the device, of a first wireless communication identifier associated with the apparatus to the device over the near field communication link;
receive, by the apparatus, a second wireless communication identifier associated with the device over the near field communication link; and
initiate establishment of a wireless connection link based on the first wireless communication identifier and the second wireless communication identifier.

10. An apparatus of claim 9, wherein the transfer of information relating to the online service is over the wireless connection link.

11. An apparatus of claim 9, wherein the online service is a voice session, and wherein the apparatus is further caused to:
generate a request to transfer the voice session to the device using the second wireless communication identifier; and
initiate transmission of the request to a platform configured to provide the online service.

12. A method comprising:
receiving a communication request at a first device over a near field communication link, wherein the communication request is for coordinating a transfer of information relating to an online service that is executing on a second device;
accepting the communication request over the near field communication link;
receiving the transfer of information relating to the online service from the second device; and
initiating execution of the online service by the first device independently from the second device after completion of the transfer of information relating to the online service.

13. A method of claim 12, further comprising:
receiving, by the first device, a first wireless communication identifier associated with the second device over the near field communication link;
initiating transfer, from the first device to the second device, a second wireless communication identifier associated with the first device over the near field communication link; and
initiating establishment of a wireless connection link based on the first wireless communication identifier and the second wireless communication identifier.

14. A method of claim 13, wherein the receiving of the transfer of information relating to the online service is over the wireless connection link.

15. A method of claim 13, wherein the first and/or second wireless communication identifier includes one or more of a mobile subscriber integrated services digital network number, an international mobile equipment identity, or a wireless pairing identifier.

16. A method of claim 12, further comprising:
receiving, by the first device, a notice of availability of user data associated with the online service at a data platform;
generating a request for the user data; initiating transmission of the request for the user data over to the data platform; and
receiving, at the first device, the user data.

17. An apparatus comprising:
at least one processor; and
at least one memory including computer program code for one or more programs, the at least one memory and the computer program code configured to, with the at least one processor, cause the apparatus to perform at least the following: receive a communication request at the apparatus over a near field communication link,
wherein the communication request is for coordinating a transfer of information
relating to an online service that is executing on a device; accept the communication request, over the near field communication link; receive the transfer of information relating to the online service from the device; and initiate execution of the online service by the apparatus independently from the device
after completion of the transfer of information relating to the online service.

18. An apparatus of claim 17, wherein the apparatus is further caused to:
receive, by the apparatus, a first wireless communication identifier associated with the device over the near field communication link;
initiate transfer, from the apparatus to the device, a second wireless communication identifier associated with the apparatus over the near field communication link; and
initiate establishment of a wireless connection link based on the first wireless communication identifier and the second wireless communication identifier.

19. An apparatus of claim 18, wherein the receiving of the transfer of information relating to the online service is over the wireless connection link.

20. An apparatus of claim 18, wherein the first and/or second wireless communication identifier includes one or more of a mobile subscriber integrated services digital network number, an international mobile equipment identity, or a wireless pairing identifier.

21. An apparatus of claim 17, wherein the apparatus is further caused to:
receive, by the apparatus, a notice of availability of user data associated with the online service at a data platform;
generate a request for the user data;
initiate transmission of the request for the user data over to the data platform; and
receive, at the apparatus, the user data.

* * * * *